Dec. 29, 1936.　　　　M. B. LANE　　　　2,065,941

MOUNTED GRINDING WHEEL

Filed March 21, 1936

Inventor
Merton B. Lane

Witness
Robert G. Trumbull

By Clayton L. Jenks
Attorney

Patented Dec. 29, 1936

2,065,941

UNITED STATES PATENT OFFICE 2,065,941

MOUNTED GRINDING WHEEL

Merton B. Lane, Holden, Mass., assignor to Norton Company, Worcester, Mass., a corporation of Massachusetts Application March 21, 1936, Serial No. 70,074

8 Claims. (Cl. 51—209)

This invention relates to grinding wheels and particularly to that type in which a body of ceramic bonded abrasive grains is cemented to a backing plate of suitable material, and particularly metal, whereby the grinding wheel may be used on its disk or side-face.

It is customary to cement a wheel of ceramic bonded abrasive grains to a metal backing plate by means of a vulcanized rubber compound, which has the ability of sticking both to the abrasive body and to the metal plate as well as compensating for differences in contraction and expansion between the abrasive body and the metal plate. It is found, however, that the rubber may not make a sufficiently strong union with the abrasive body and the backing plate to permit the grinding wheel to be used at a high rotational speed and with the generation of a considerable amount of frictional heat. Hard rubber and various other materials proposed for strengthening the union are found to be thermoplastic and to soften below the high temperatures some times generated and thus permit disruption of the wheel. It is therefore desirable to employ a cementitious medium which is not thermoplastic or detrimentally affected by the temperature of a dry grinding operation, which may be as high as 250° F. or more.

The primary object of this invention is to improve the adhesion of the central rubber cementing medium to either the abrasive body or the plate or both and thereby to enable the wheel to be used at a high speed and under severe temperature conditions and otherwise to provide a satisfactory mounted wheel for varied industrial uses. Other objects will be apparent in the following disclosure.

In accordance with this invention, I propose to utilize sodium silicate as an intermediate cementing agent between the rubber layer and the bonded abrasive body and, if desired, between the rubber and the metal plate and thus to strengthen the union therebetween.

Referring to the drawing, I have there illustrated diagrammatically and in exaggerated proportions two embodiments of my invention showing the relationship of the abrasive body and a metal backing plate with the intermediate layer of rubber and the sodium silicate which aids in holding the outer parts to the rubber, and wherein.

Figure 1:
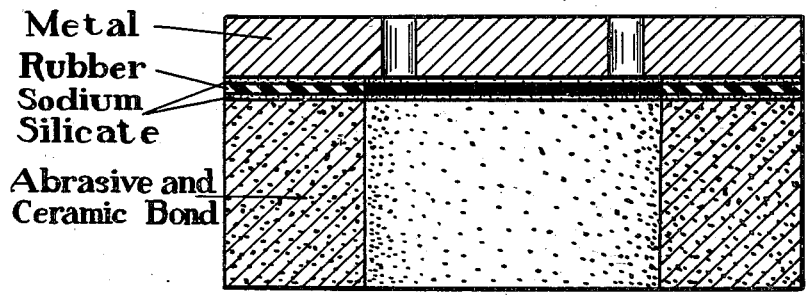
Fig. 1 is a diametrical sectional view of a wheel having the sodium silicate layer only adjacent to the abrasive side.

The abrasive body is customarily made by bonding together grains of crystalline alumina, silicon carbide or other suitable abrasive by means of vitrified ceramic materials. The raw bond ordinarily comprises a mixture of various clays, such as slip clay and ball clay, with kaolin, feldspar, flint, or various other well known materials. The mixture of abrasive grains and ceramic bond of suitable proportions is first made into a moldable mass by means of water and then shaped as desired, after which the article is fired in a suitable ceramic kiln to a temperature sufficient to vitrify the bond to a glassy or porcelanic condition. The bond is ordinarily present in insufficient amount to fill the pores of the grinding wheel, and consequently there are large surface pores into which the cementing materials may penetrate.

For the purpose of mounting the ceramic bonded abrasive body, or other suitable porous body, upon a metal backing plate, the following procedure may be adopted. It is desirable to clean the metal backing plate, such as by means of a sand blasting operation, to insure that the plate is clean and preferably has a roughened surface to which the rubber or the sodium silicate will adhere firmly. Other precautions and steps may be adopted to insure that the rubber or sodium silicate will adhere thereto; and the order of the steps herein set forth may of course be varied.

A solution of sodium silicate, or the standard waterglass of commerce, is impregnated into the surface pores of that side of the abrasive body which has been shaped to fit against the metal plate. It is preferred that the sodium silicate be left in a tacky or sticky condition so that it will make a very complete union with the layer of rubber applied thereto. It will be appreciated that the sodium silicate is related to the vitrified bond of the grinding wheel, since the bond is a complex silicate derived from the clay materials, and that the sodium silicate has the capacity of uniting firmly with the bonded structure of the wheel. The viscosity of the sodium silicate may be as desired, but preferably high so that the material will penetrate only the surface pores and not go down materially into the grinding zone of the wheel. Incidentally, this coating need not completely fill the pores of the abrasive body and make a smooth surface on the wheel, but it may be sufficiently thin so that it will merely penetrate the pores and adhere to their surfaces but leave the outer face of the grinding wheel still somewhat roughened. Nevertheless, the sodium silicate layer preferably coats the abrasive body sufficiently so that the rubber does not come into direct contact therewith to any large extent, but touches only the sodium silicate.

The metal plate may be likewise coated with a thin layer of the sticky sodium silicate or, if desired, this layer may be omitted. Then, while the sodium silicate is in a soft and tacky condition, the abrasive body and plate are assembled with a sheet of vulcanizable rubber compound interposed therebetween, with their sodium silicate coatings, as shown in the various figures of the drawing.

I have achieved excellent results with the use of compositions of the following formulae:

|  |  | I | II |
|---|---|---|---|
| Rubber | lbs | 29 | 40 |
| Zinc oxide | do | 63 | 52 |
| Magnesia | do | 3 | 3 |
| Sulfur | do | 3 | 3 |
| Oil of petrolatum | do | 2 | 2 |

The various ingredients above listed are given merely as illustrative of the invention, and it will be understood that other well known materials may be substituted for or added to the above ingredients in desired proportions. It is ordinarily desirable to so proportion the sulfur content and carry on the vulcanization step as to form a soft resilient rubber; but where a hard rubber is satisfactory for the cementing body, such as for a low temperature grinding operation, the sulfur may be proportioned accordingly, such as 38% of the bond. The sodium silicate is found to aid the union of the hard rubber layer with the outside rigid bodies. The rubber compound may comprise other ingredients of standard use and known properties as may be desired, such as carbon black, clay, whiting and the like.

The rubber compounding materials are mixed according to standard practice and preferably by means of a mill having revolving heated rollers of adjustable spacing between which the sheet of raw rubber is repeatedly passed with the other materials added gradually between folds of the rubber, whereby the compounding ingredients are worked into the plastic rubber body and a substantially uniform mixture is produced. Other methods may of course be adopted. Then the unvulcanized rubber compound, in a layer of suitable thickness, such as $\frac{3}{32}$ inch, is placed between the coated face of the abrasive body and the metal plate with or without a silicate coating, and the assembled mass is subjected to heat and pressure in a standard vulcanizing operation.

As an illustration of a satisfactory process for mounting a wheel on a metal plate, as shown in Fig. 1, the soft plastic rubber compound of either of the formulas above noted may be applied in a layer $\frac{3}{32}$ inch thick directly onto the face of the sand blasted metal. Also water glass is sprayed or brushed or poured onto the face of the abrasive body to such an extent as to fill the surface pores with the viscous material and coat the face roughly as shown in the drawing. The parts are assembled and then subjected to heat and pressure, before the sodium silicate has hardened, so as to vulcanize the rubber. This may comprise a temperature of approximately 160° C. for about 16 hours and a pressure sufficient to insure a firm union between the parts, such as 30 pounds per square inch. The sulfur content is such as to produce a soft resilient rubber which is not thermoplastic under the conditions of grinding. When subjected to a tensional test to determine what force would be required to separate the rubber from the outside bodies, it was found that separation occurred under a pull of 400 lbs. per square inch. This is a very high force as compared with that previously required where the rubber adheres directly to the abrasive body.

Figure 2:
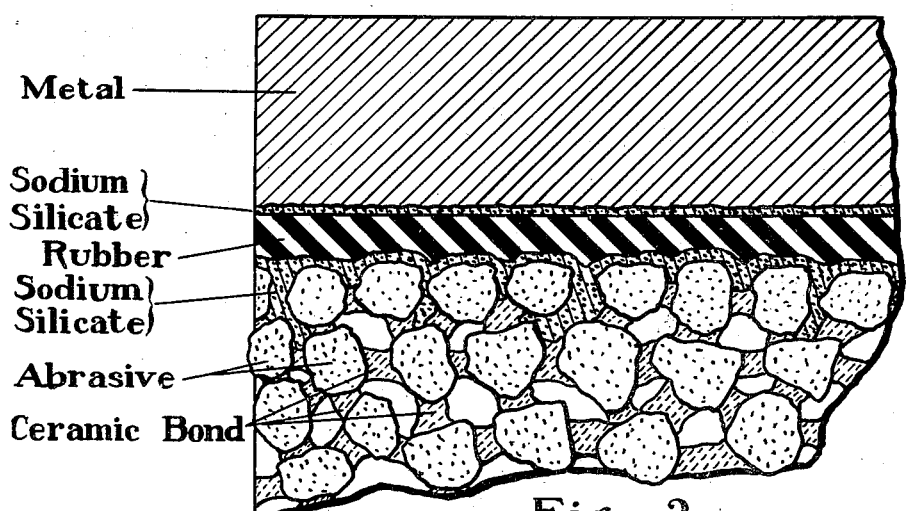
Fig. 2 is an enlarged fragmentary section showing the sodium silicate on both sides of the rubber layer.
Figure 3:
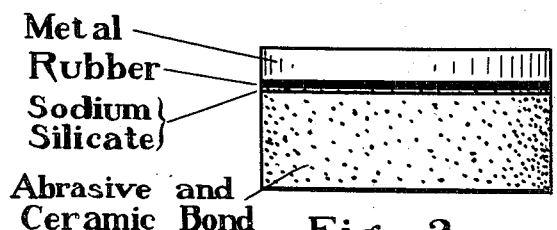
Fig. 3 is an elevation of the wheel shown in Fig. 1.

Similarly, another assembled body was made up with the water glass engaging both the metal and the abrasive body as indicated in Fig. 2 and the grinding wheel was otherwise made as above described. In this case, the force required to pull the wheel apart was 432 lbs. per square inch, thus showing that the sodium silicate aided on the metal side as well as on the abrasive side of the rubber. It will be understood that the temperature of vulcanization is sufficient to harden the plastic sodium silicate and cause it to form an integral union with its associated parts. It is presumed that in this case the sticky sodium silicate makes a better union with the metal than does the rubber compound, and that the zinc oxide in the rubber compound unites with the sodium silicate to form a very intimate union therebetween. It is, therefore, desirable to employ a large content of zinc oxide in the rubber compound, and preferably from 40% to 70% by weight of the rubber compound, in order to improve the adhesive strength, if the wheel is to be subjected to high disruptive forces. In other cases, the zinc oxide may be omitted or used in quantities smaller or greater than indicated above.

It will thus be seen that there has been provided by this invention an article in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawing is to be interpreted as illustrative and not in a limiting sense.

I claim:

1. A grinding wheel comprising an abrasive body cemented rigidly to a backing plate by an intermediate cementitious medium including a layer of vulcanized soft resilient rubber and a layer of sodium silicate between the rubber layer and one of the outer bodies.

2. A grinding wheel comprising an abrasive body cemented to a metal backing plate by a cementitious medium including a layer of sodium silicate coating and adhering to the surface of the abrasive body, a layer of vulcanized rubber compound adhering to the sodium silicate layer and a metal backing plate integrally connected with the intermediate rubber layer.

3. A grinding wheel comprising an abrasive body cemented rigidly to a backing plate by an intermediate cementitious medium including a layer of vulcanized rubber secured to the abrasive body and a layer of sodium silicate between the rubber and the metal plate and adhesively securing them together.

4. A grinding wheel of the type covered by claim 2 in which a layer of sodium silicate is interposed between the vulcanized rubber compound and the metal backing plate and insures firm union therebetween.

5. A grinding wheel of the type covered by claim 2 in which the rubber compound contains from 40 to 70% by weight of zinc oxide.

6. A grinding wheel comprising a porous body of ceramic bonded abrasive grains having its surface pores impregnated with sodium silicate, a soft resilient layer of rubber compound containing sulfur and zinc oxide which adheres firmly to the sodium silicate coating, and a metal backing plate integrally secured to the rubber layer.

7. A grinding wheel made of a metal backing plate having a porous body of ceramic bonded abrasive grains secured thereon by a cementitious medium comprising a coating of sodium silicate impregnating the surface pores of one face of the abrasive body, a soft resilient layer of vulcanized rubber compound containing sulfur and from 40% to 70% by weight of zinc oxide which adheres to the sodium silicate coating and to the metal plate.

8. A grinding wheel made of a metal backing plate having a porous body of ceramic bonded abrasive grains secured thereon by a cementitious medium comprising a coating of sodium silicate impregnating the surface pores of one face of the abrasive body, a soft resilient layer of vulcanized rubber compound containing sulfur and from 40% to 70% by weight of zinc oxide which adheres to the sodium silicate coating and a further layer of sodium silicate interposed between the rubber compound and the metal backing plate and uniting the same.

MERTON B. LANE.